(12) United States Patent
Marchand

(10) Patent No.: US 9,638,362 B2
(45) Date of Patent: May 2, 2017

(54) THREADED CONNECTIONS WITH AN ADJUSTABLE SECONDARY SHOULDER

(71) Applicant: National Oilwell Varco, L.P., Houston, TX (US)

(72) Inventor: Nicholas Ryan Marchand, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 253 days.

(21) Appl. No.: 14/268,616

(22) Filed: May 2, 2014

(65) Prior Publication Data

US 2015/0316180 A1   Nov. 5, 2015

(51) Int. Cl.
| | |
|---|---|
| *F16L 55/00* | (2006.01) |
| *F16L 15/00* | (2006.01) |
| *E21B 17/042* | (2006.01) |
| *F16L 15/08* | (2006.01) |

(52) U.S. Cl.
CPC ........ *F16L 15/007* (2013.01); *E21B 17/0423* (2013.01); *F16L 15/00* (2013.01); *F16L 15/08* (2013.01); *F16L 15/001* (2013.01); *F16L 2201/40* (2013.01); *Y10T 29/49964* (2015.01)

(58) Field of Classification Search
USPC ............................................ 285/85, 92, 390
See application file for complete search history.

(56) References Cited

U.S. PATENT DOCUMENTS

| | | | |
|---|---|---|---|
| 1,315,610 A | 9/1919 | Schulz | |
| 1,349,518 A | 8/1920 | Lyle | |
| 1,541,725 A * | 6/1925 | Martin | F16L 41/14 220/243 |
| 1,707,087 A | 3/1929 | Little | |
| 1,999,706 A | 4/1935 | Spang | |
| 2,102,072 A | 12/1937 | Hinderliter | |
| 2,150,221 A | 3/1939 | Hinderliter | |
| 2,308,066 A | 1/1943 | Evans | |
| 2,376,058 A | 5/1945 | Jeffreys | |
| 2,575,685 A | 11/1951 | Shugart et al. | |
| 2,644,524 A | 7/1953 | Baker | |
| 2,907,589 A | 10/1959 | Knox | |

(Continued)

FOREIGN PATENT DOCUMENTS

| | | |
|---|---|---|
| DE | 82851 B | 6/1971 |
| EP | 0268306 A2 | 5/1988 |

(Continued)

OTHER PUBLICATIONS

PCT/US2015/028794 International Search Report and Written Opinion dated Nov. 18, 2015 (13 p.).

(Continued)

*Primary Examiner* — Aaron Dunwoody
(74) *Attorney, Agent, or Firm* — Conley Rose, P.C.

(57) ABSTRACT

A tubular threaded connection includes a threaded sub-assembly having a first tubular member, a first torque member threadingly received on the first tubular member, and a second torque member threadingly received on the first tubular member. In forming the threaded sub-assembly, the first torque member is torqued relative to the second torque member. Furthermore, the sub-assembly is configured to receive a second tubular member for torqueing against the sub-assembly.

14 Claims, 5 Drawing Sheets

(56) References Cited

U.S. PATENT DOCUMENTS

| | | | |
|---|---|---|---|
| 3,359,013 | A | 12/1967 | Knox et al. |
| 3,427,050 | A | 2/1969 | Krieg |
| 3,608,933 | A | 9/1971 | Lee |
| 4,067,404 | A | 1/1978 | Crase |
| 4,099,745 | A | 7/1978 | Cobbs |
| 4,209,193 | A | 6/1980 | Ahlstone |
| 4,220,214 | A | 9/1980 | Benoit |
| 4,346,920 | A | 8/1982 | Dailey |
| 4,534,585 | A | 8/1985 | Saliger |
| 4,613,161 | A | 9/1986 | Brisco |
| 4,643,467 | A | 2/1987 | Wood |
| 4,658,915 | A | 4/1987 | Goris et al. |
| 4,801,160 | A | 1/1989 | Barrington |
| 5,050,691 | A | 9/1991 | Moses |
| 5,083,821 | A | 1/1992 | Friend |
| 5,785,357 | A | 7/1998 | Foster et al. |
| 6,755,447 | B2 | 6/2004 | Galle, Jr. et al. |
| 6,811,189 | B1 | 11/2004 | Delange et al. |
| 6,840,550 | B2 | 1/2005 | Sundholm |
| 6,857,668 | B2 | 2/2005 | Otten et al. |
| 7,070,208 | B2 | 7/2006 | Richey et al. |
| 7,424,833 | B2 | 9/2008 | Fich et al. |
| 8,827,316 | B2 | 9/2014 | Raczynski et al. |
| 2003/0168851 | A1 | 9/2003 | Winship |
| 2004/0046392 | A1 | 3/2004 | Sundholm |
| 2004/0164548 | A1 | 8/2004 | Richey et al. |
| 2004/0211275 | A1 | 10/2004 | Fich et al. |
| 2010/0005643 | A1 | 1/2010 | Evans et al. |

FOREIGN PATENT DOCUMENTS

| | | |
|---|---|---|
| EP | 1483476 B1 | 5/2006 |
| FR | 1248507 A | 12/1960 |
| FR | 1300262 A | 8/1962 |
| GB | 191510156 A | 7/1916 |
| GB | 259894 A | 10/1926 |
| GB | 355528 A | 8/1931 |
| WO | 94/20726 A1 | 9/1994 |
| WO | 97/11303 A1 | 3/1997 |
| WO | 2008/117172 A2 | 10/2008 |
| WO | 2009132259 A2 | 10/2009 |
| WO | 2012/006455 A2 | 1/2012 |

OTHER PUBLICATIONS

Notice of Allowance dated May 14, 2014 for U.S. Appl. No. 12/989,388 (21 p.).
EPO Rule 71(3) Communication (Intention to Grant) for European Application No. 09736084.6 (21 p.).
Canadian Office Action dated Jul. 2, 2014 for Canadian Application No. 2,804,503 (2 p.).
Response to Canadian Office Action Dated Jul. 2, 2014 for Canadian Application No. 2,804,503; Response filed Dec. 23, 2014 (10 p.).
Chinese Office Action dated Apr. 18, 2014 for Chinese Application No. 201180033789.5 (9 p.).
English Translation of Chinese Office Action dated Apr. 18, 2014 for Chinese Application No. 201180033789.5 (11 p.).
Chinese Office Action dated Dec. 15, 2014 for Chinese Application No. 201180033789.5 (3 p.).
English Translation of Chinese Office Action dated Dec. 15, 2014 for Chinese Application No. 201180033789.5 (3 p.).
Response to Chinese Office Action Dated Dec. 15, 2014 for Chinese Application No. 201180033789.5; Response filed Feb. 5, 2015 (8 p.).
Office Action dated Mar. 16, 2015 for U.S. Appl. No. 13/808,870 (29 p.).
European Supplementary Search Report dated Aug. 27, 2013; European Application No. 09736084 (6 p.).
Canadian Office Action dated Jul. 22, 2013; Canadian Application No. 2,721,587 (2 p.).
Canadian Office Action dated Jul. 4, 2012; Canadian Application No. 2,721,587 (2 p.).
PCT/US2011/043238 International Search Report and Written Opinion dated Nov. 26, 2012 (13 p.).
PCT/US2009/041645 International Search Report and Written Opinion dated Dec. 7, 2009 (12 p.).
PCT/US2009/041645 Submission of Informal Comments to the Written Opinion dated Dec. 7, 2009 (4 p.).
Canadian Notice of Allowance dated Mar. 20, 2014; Canadian Application No. 2,721,587 (1 p.).
Response to European Search Report; European Application No. 09736084.6; Response filed Mar. 24, 2014 (7 p.).
Canadian Response to Office Action dated Jul. 22, 2013; Canadian Application No. 2,721,587; Response filed Dec. 20, 2013 (12 p.).
Canadian Response to Office Action dated Jul. 4, 2012; Canadian Application No. 2,721,587; Response filed Jan. 3, 2013 (23 p.).
Office Action Dated Jun. 15, 2012; U.S. Appl. No. 12/989,388 (16 p.).
Response to Office Action Dated Jun. 15, 2012; U.S. Appl. No. 12/989,388, filed Nov. 15, 2012 (17 p.).
Final Office Action Dated Feb. 28, 2013; U.S. Appl. No. 12/989,388 (9 p.).
Response to Final Office Action Dated Feb. 28, 2013; U.S. Appl. No. 12/989,388, filed May 28, 2013 (8 p.).
Advisory Action Dated Jun. 11, 2013; U.S. Appl. No. 12/989,388 (3 p.).
Request for Continued Examination and Response to Final Office Action Dated Feb. 28, 2013; U.S. Appl. No. 12/989,388, filed Jun. 28, 2013 (15 p.).

* cited by examiner

THREADED CONNECTIONS WITH AN ADJUSTABLE SECONDARY SHOULDER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The disclosure relates to threaded tubular connections and the like. More particularly, the disclosure relates to an apparatus and method for joining tubular members using threaded sections and contact faces in a manner that increases the thread torque capacity.

In the oil and gas production industry, pipe or other tubular sections may be connected via threaded connections, such as mating pin and box ends. The threaded connections are often subjected to large torsion forces, such as during downhole operations like drilling. The torque or yield strength of the connection is dictated by the thread profile, the material properties and the dimensions of the mating threaded components. However, due to space or other constraints in a well bore, often times the threaded connection design is limited as to the size and thread type that can be used, thereby limiting the yield strength of the connection. It is particularly problematic to achieve increased yield strength in a connection that is made up onto a threaded pin face. Sometimes it is necessary to have a connection that is stronger than what can be achieved in an existing design. Thus, it is advantageous to increase the yield or torque strength of a threaded connection.

To increase the torque capacity of a particular threaded connection, a thread locking compound (such as Loctite®) is sometimes applied to the threads. This tends to increase the grip between the mating threaded components, thus increasing the torque capacity of the overall connection. However, thread locking compounds are undesirable because the threaded connection so treated can be very difficult to disassemble after makeup because the connection must be heated to break-down the locking compound. This is a time consuming process and the high heat required to break apart the thread locking compound can damage equipment.

Other attempts to increase the torque capacity of the connection include using higher strength material for the threaded components or using a conventional double shoulder type design. However, higher strength materials are generally more expensive and might not be available. Furthermore, even high strength materials, alone, might fail to meet the high torque requirements of drilling operations. Additionally, double shoulder type threaded connections require precise dimensional tolerances among the fixed outer pin face to outer box face interface and the fixed inner pin face to inner box face interface. Should these dimensions be imprecise, similar threaded connections may have torque strengths that are dissimilar, unpredictable, and provide little advantage over standard threaded connections.

Applying thread locking compound, changing the thread profile or changing material selection present significant disadvantages or provide insufficient benefit when attempting to improve the yield strength of a threaded connection under high torsional loads. Thus, there remains a need for a threaded connection that advantageously increases the torque strength of a threaded connection, particularly while also staying within current downhole design specifications.

BRIEF SUMMARY OF THE DISCLOSURE

In an embodiment, a tubular threaded connection includes a threaded sub-assembly having a first tubular member, a first torque member threadingly received on the first tubular member, and a second torque member threadingly received on the first tubular member. In the threaded sub-assembly, the first torque member is torqued relative to the second torque member. Furthermore, the sub-assembly is configured to receive a second tubular member for torqueing against the sub-assembly.

In another embodiment, a method for forming a threaded connection includes: threading an adapter onto a mandrel; threading a first ring against the adapter at an outer shoulder of the adapter; threading a second ring against the first ring; and torqueing the second ring against the first ring.

In still another embodiment, a tubular threaded connection includes a first tubular member having a pin end with an externally-disposed pin face and an externally-disposed pin threaded section. The tubular threaded connection further includes a first torque member configured to be threadingly coupled to the pin end, and a second torque member configured to be threadingly coupled to the pin end while the first torque member is coupled to the pin end. Still further, the tubular threaded connection includes a second tubular member comprising a box end having an inner box face, outer box face, and an internally-disposed box threaded section extending between the outer box face and the inner box face. In addition, the box end is configured to be threadingly coupled to the pin end while the first and second torque members are coupled to the pin end, and the box end is further configured for the inner box face to engage the pin face to form a first interface therebetween. Moreover, the second torque member is movable from a first position to a second position against the outer box face of the second tubular member to form a second interface therebetween; and the first torque member is movable from a third position to a fourth position against the second torque member to form a third interface therebetween.

BRIEF DESCRIPTION OF THE DRAWINGS

For a detailed description of the disclosed embodiments, reference will now be made to the accompanying drawings in which.

NOTATION AND NOMENCLATURE

Figure 1:
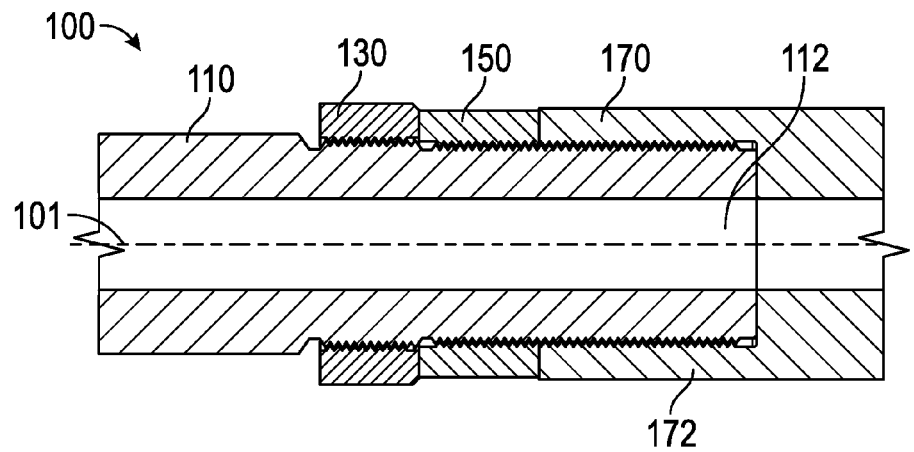
FIG. 1 is a schematic showing a cross-section of a threaded torque apparatus in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, within the specification, including the drawings, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections.

The recitation "based on" means "based at least in part on." Therefore, if X is based on Y, X may be based on Y and any number of other factors. In addition, as used herein, including the claims, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, in the disclosure, including the claims, the following definitions will apply.

The term "box" refers to an end of a tubular member having female, i.e. internally-disposed, threads cut into the inner diameter and the term "pin" refers to an end of a tubular member having male, i.e. externally-disposed, threads cut into the outer diameter. The term "tubular member" and "pipe," and the like as used herein, including in the claims, shall include pipe, casing, tubing, and other generally cylindrical objects.

As broadly as the context allows, the term "thread diameter" refers to any diameter related to threads, such as the major diameter, the pitch diameter, and the minor diameter.

Use of the concepts of the present disclosure is not limited to pipe thread connections and may find utility in other threaded connection applications, both within oilfield technology and other areas to which the concepts of the current disclosure may be applied. The various characteristics mentioned above, as well as other features and characteristics described in more detail below, will be readily apparent to those skilled in the art upon reading the following detailed description of the embodiments, and by referring to the accompanying drawings.

DETAILED DESCRIPTION OF THE DISCLOSED EMBODIMENTS

Referring to the schematic of FIG. 1, an exemplary embodiment of a torque apparatus 100 for forming a threaded connection comprises a central axis 101, a tubular member 110 or a mandrel 110 having an externally-threaded pin end 112, a torque member 130 threadingly coupled to pin end 112, a torque member 150 threadingly coupled to pin end 112, and a tubular member 170 having an internally-threaded box end 172. As is applicable in some embodiments, tubular member 170 will also be called a coupler or an adapter 170, and torque member 150 will also be called threaded ring 150. Furthermore, torque member 130 may also be called a threaded ring 130.

FIG. 1 represents torque apparatus 100 in an assembled and torqued configuration, i.e. formed into a threaded connection. In general operation, torque member 130 is threaded onto the unengaged pin end 112, followed by torque member 150 and tubular member 170, threaded in-sequence onto pin end 112, each traveling axially in a first direction, which is leftward according to the orientation of FIG. 1. In this process, tubular member 170 may be fully threaded on pin end 112 without being tightened or torqued. Torque member 150 is then threaded backwards or in the opposite direction (e.g. rightward for FIG. 1) to engage tubular member 170, and next, torque member 130 is also threaded backwards or in the opposite direction to engage torque member 150. Torque members 130, 150 are then torqued against each other. For example, torque member 130 may be torqued against torque member 150 and may rotate relative to member 150 while member 150 is held fixed so as not to rotate. As a result, torque member 150 remains engaged with tubular member 170 during and after the torqueing of members 130, 150. In the torqueing example, a torque or a moment of force may be applied to torque member 130 in order achieve a general or a specified level of torque, tightness, or pre-loading between member 130 and member 150. Tubular member 170 may then be similarly torqued against pin end 112 and member 150 simultaneously. Other manners of making-up torque apparatus 100 are also contemplated.

Figure 2:
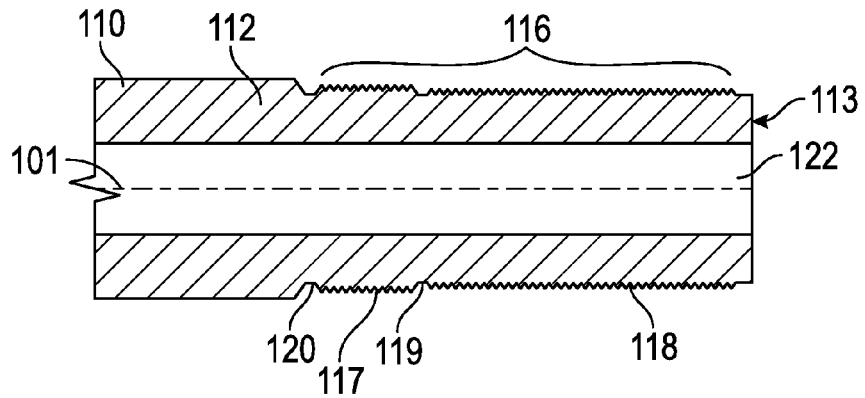
FIG. 2 is a schematic showing a cross-section of the externally threaded pin end of the mandrel of the torque apparatus of FIG. 1.

Referring now to FIG. 2, pin end 112 of mandrel 110 includes an externally-disposed radially-extending pin face 113, an externally-disposed threaded section 116 terminating at a circumferential undercut region 120 located distal pin face 113, and a central flow passage 122 extending along axis 101. In this embodiment, threaded section 116 includes two separate male threads 117, 118, i.e. two distinct male-thread portions, that are separated or interrupted by a circumferential thread gap 119; however, each male pin thread 117, 118 is uninterrupted, i.e. continuous. In the example of FIG. 1, torque member 130 engages threads 117 or, equivalently, threaded portion 117. Torque member 150 and adapter 170 engage threads 118 or, equivalently, threaded portion 118. In some embodiments, torque members 130,

150 both engage threads 117, which is appropriately lengthened, and threads 118 are shortened to accommodate adapter 170 alone.

In FIG. 2, pin threads 117 have a thread characteristic that differs from pin threads 118. In this example, threads 117 have a larger diameter than threads 118. In general the threads 117, 118 include any straight thread profile such as, for example, Acme, Stub Acme, Unified, another suitable standard profile, or any suitable custom thread profile. Thus, another thread characteristic that may differ between threads 117, 118 in some embodiments is thread profile. In various other embodiments, threaded portions 117, 118 share the same thread characteristics including, for example, thread diameter and profile. As described, in at least some embodiments, threaded section 116 does not include tapered threads.

In FIG. 2, pin threads 117 of pin end 112 are formed as a single, continuous helical thread path, having a single starting thread-end and a single terminating thread-end. Pin threads 118 are similarly formed. In some embodiments, pin threads 117 are formed as a plurality of continuous, parallel helical thread paths, each helical thread path having a starting thread-end and a terminating thread-end. Pin threads 118 may be similarly formed by a plurality of continuous, parallel helical thread paths in some embodiments.

In various embodiments, thread gap 119 extends axially, extends radially, or extends both axially and radially. In some embodiments of pin end 112, threaded section 116 has no gap 119 and includes a single, uninterrupted male threaded portion extending a length that is generally equivalent to the combined length of male threaded portions 117, 118 and thread gap 119. Some other embodiments of pin threaded section 116 have three separate male threaded portions, with a thread gap between each adjacent pair of threaded portions. In the embodiments having three distinct threaded portions, torque members 130, 150, and adapter 170 each engage a separate portion of pin threaded section 116. In some of these embodiments, each of the three threaded portions has a thread characteristic that differs from the other two portions.

Figure 3:
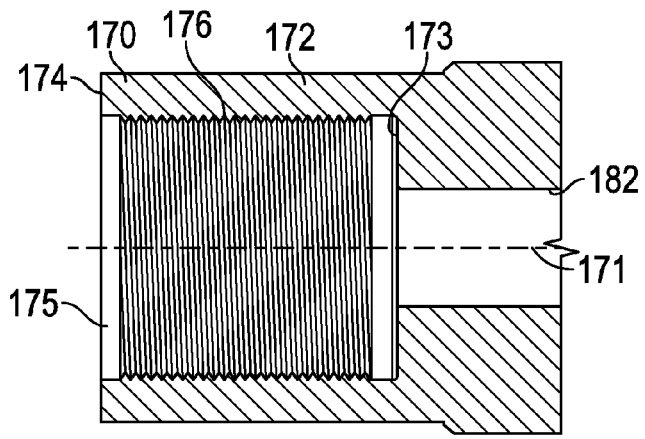
FIG. 3 is a schematic showing a cross-section of the internally threaded box end of the adapter of the torque apparatus of FIG. 1.

Referring now to FIG. 3, adapter 170, i.e. tubular member 170, includes a central axis 171 extending through box end 172. Box end 172 includes an internally-disposed radially-extending inner box face 173, externally-disposed radially-extending outer box face 174, a box cavity 175 extending axially from outer box face 174 to inner box face 173, and an internally-disposed box threaded section 176 having female threads within box cavity 175. In this embodiment, adapter 170 further includes a central flow passage 182 adjoining and in fluid communication with box cavity 175. Inner box face 173 and outer box face 174 may also be called shoulders. Outer box face 174 is located at a terminal portion of box end 172. In some embodiments, box threaded section 176 is located along a significant portion of the axial length of the inner diameter of the box cavity 175 and is uninterrupted. Inner box face 173 and outer box face 174 extend radially and are perpendicular to axis 171. In some embodiments, a box face 173, 174 is tapered, i.e. not perpendicular, with respect to axis 171. The female threads of box threaded section 176 are compatible with, i.e. configured to couple, the male threads of threaded portion 118 of pin threaded section 116. In some embodiments, the axial length of the threads 118 is greater than the axial length of box threaded section 176.

Figure 4:
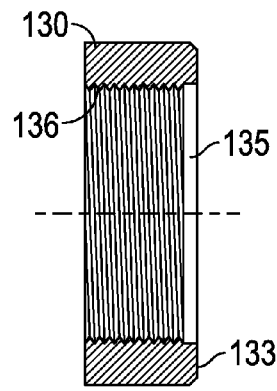
FIG. 4 is a schematic showing a cross-section of the internally threaded torque member of the torque apparatus of FIG. 1.

Referring to FIG. 4, torque member 130 includes a shoulder or torque member face or shoulder 133, a through-passage 135, and a torque member threaded section 136 having female threads. In the example shown, torque member threaded section 136 is located along a significant portion of the axial length of the inner diameter of through-passage 135 and is an uninterrupted threadform. The female threads of torque member threaded section 136 are compatible with the male threads 117 of pin threaded section 116. In some embodiments, the axial length of the pin threads 117 is equal to or less than the axial length of torque member threaded section 136. The undercut region 120 adjacent pin threads 117 on pin end 112 (FIG. 2) allows torque member threaded section 136 to advance axially further from pin face 113 than pin threads 117 extend. In some embodiments, the axial length of the pin threads 117 is greater than the axial length of torque member threaded section 136.

Figure 5:
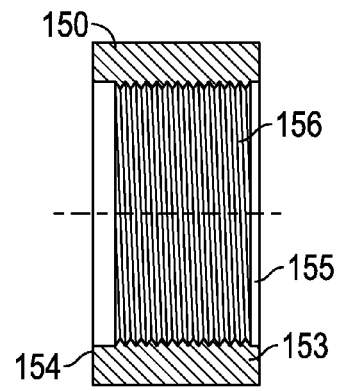
FIG. 5 is a schematic showing a cross-section of the internally threaded ring of the torque apparatus of FIG. 1.

Referring to FIG. 5, torque member 150 or, equivalently threaded ring 150, includes a ring face 153, a ring face 154, a through-passage 155, and a ring threaded section 156 having female threads. Ring face 153 may also be called ring shoulder 153, and ring face 154 may also be called ring shoulder 154. In the example shown, ring threaded section 156 is located along a significant portion of the axial length of the inner diameter of through-passage 155 and is an uninterrupted threadform. The female threads of threaded section 156 are compatible with the male threads 118 of pin threaded section 116. The axial length of the pin threads 118 is greater than the axial length of ring threaded section 156.

Figure 6:
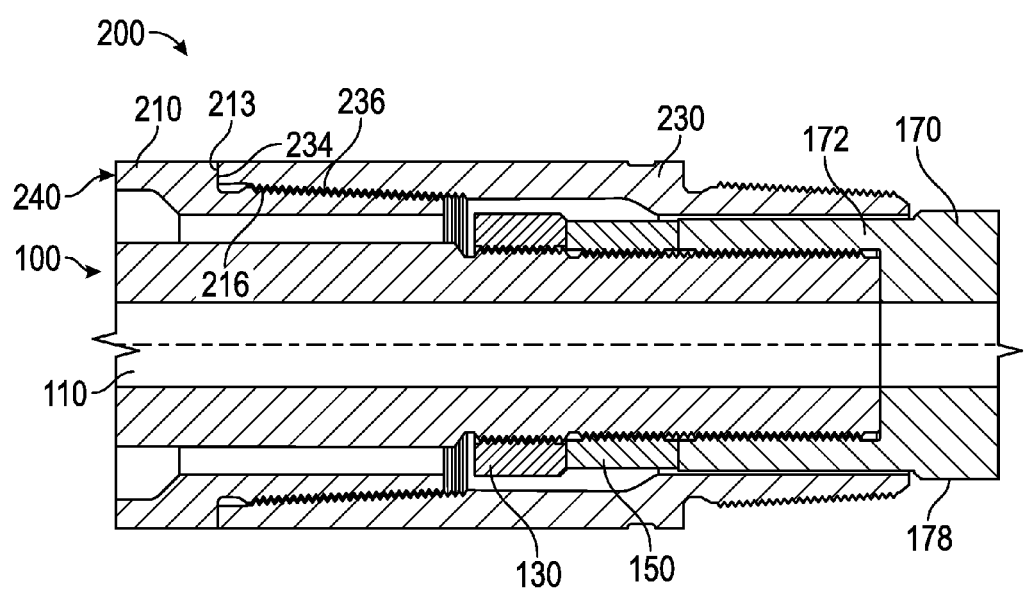
FIG. 6 is a schematic showing a cross-section of a threaded torque apparatus in accordance with principles described herein.
Figure 7:
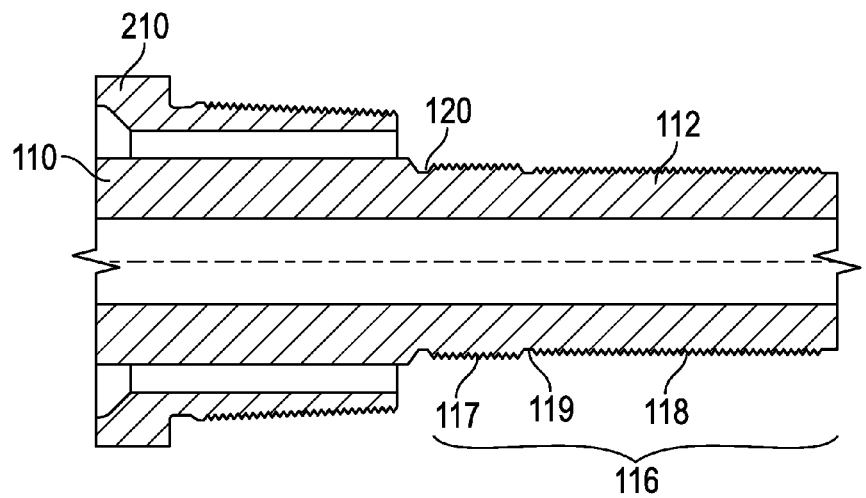
FIG. 7 is a schematic showing a cross-section of the torque apparatus of FIG. 6 at a first stage of assembly.

FIG. 6 schematically presents another embodiment of a torque apparatus for forming a threaded connection. In FIG. 6, torque apparatus 200 includes torque apparatus 100 (e.g. FIG. 1) and a housing assembly 240 that surround a portion of torque apparatus 100. Housing assembly 240 includes two tubular or cylindrical outer housing members 210, 230 threadingly coupled together. Housing assembly 240 couples to torque apparatus 100 in a manner that allows axial rotation of apparatus 100 relative to housing members 210, 230. The coupling of housing assembly 240 to torque apparatus 100 may be accomplished with additional components not depicted in FIG. 6 by any manner known in the art. At one end, housing member 210 includes a housing threaded section 216 having male threads that threadingly receive a compatible threaded section 236 of female threads located along a portion of the inner surface of housing member 230. In this embodiment, threaded sections 216, 236 are tapered threads. On the outer housing member 210, a radially-extending, exterior shoulder 213 adjacent threaded section 216 engages a radially-extending housing end face 234 of outer housing member 230. Outer housing members 210, 230 are characterized by one or more inner diameters that are sufficient to accommodate the various members of torque apparatus 100.

Figure 8:
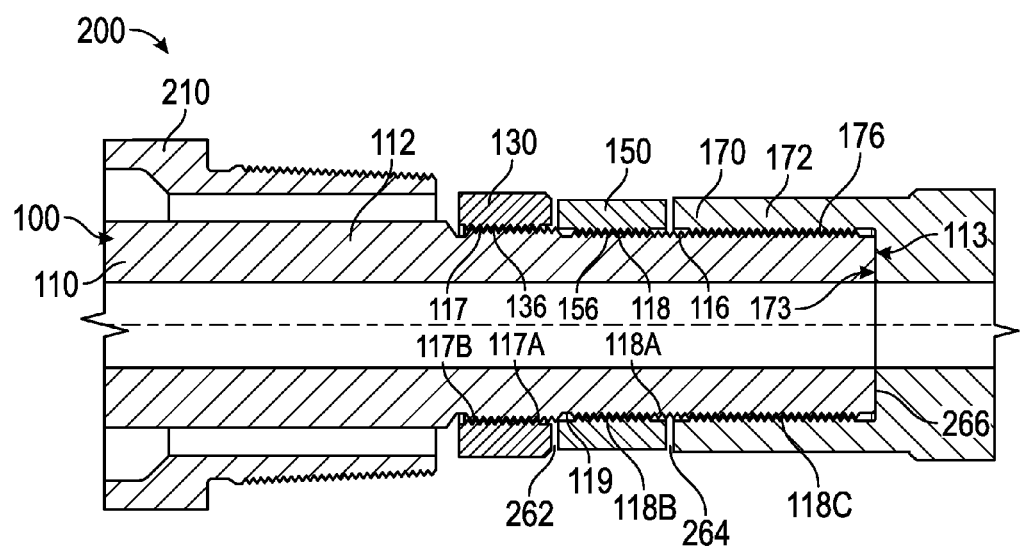
FIG. 8 is a schematic showing a cross-section of the torque apparatus of FIG. 6 at a second stage of assembly.

FIG. 6 to FIG. 11 depict embodiments of various stages of an assembly method for torque apparatus 200. Method steps for assembling a torque apparatus, such as torque apparatus 200 for example, are disclosed or discernible based on the various figures and discussions disclosed herein. As will be apparent, several of these stages and steps of the assembly method are also applicable to torque apparatus 100 of FIG. 1. Referring initially to the schematic depiction of FIG. 7, pin end 112 of mandrel 110 (e.g. FIG. 2) is shown disposed within outer housing member 210. Referring now to FIG. 8, torque member 130 is shown with female threaded section 136 threaded to male threads 117 of pin end 112 on mandrel 110. In certain embodiments already described, the torque member threaded section 136 includes an axial length less than the axial length of the pin threads 117 such that torque member 130 can be threaded variable distances onto the pin end 112 while also leaving an exposed portion 117A of the pin threads 117, as shown in FIG. 8. Consequently, pin threads 117 have an exposed portion 117A and an engaged portion 117B. Exposed portion 117A is proximal pin end face 113 in FIG. 8. However, in various embodiments, the exposed portion 117A may be situated on either side of torque member 130 or on both sides of torque member 130.

Also in FIG. 8, threaded ring 150 is shown with female threaded section 156 threaded to male threads 118 of pin end 112 on mandrel 110. During assembly, threaded ring 150 is coupled to pin end 112 after torque member 130. Initially, torque member 130 and threaded ring 150 do not touch in a first, unengaged position of torque member 130 relative to ring 150, leaving an assembly gap 262 between torque member face 133 and ring face 154 adjacent thread gap 119 in pin end 112.

Box end 172 of adapter 170 is shown with female threaded section 176 threaded to male threads 118 of pin end 112. During assembly, adapter 170 is threadingly received on pin end 112 after torque member 130 and after threaded ring 150. During the initial make-up shown in FIG. 8, a portion 118A of the pin threads 118 remains exposed between ring 150, which engages thread portion 118B, and adapter 170, which engages thread portion 118C between the pin end 112 and the box end 172. In this manner, threaded ring 150 is spaced apart from box end 172 in a first, unengaged position of ring 150 relative to box end 172, leaving an assembly gap 264 between ring face 153 and outer box face 174. For the threaded connection between pin end 112 and box end 172, inner box face 173 engages pin face 113, forming an interface 266, but in FIG. 8 the threaded connection is made without torqueing or with minimal torqueing, i.e. minimal tightening, so interface 266 is not torqued. In some other instances or some other embodiments, the threaded connection between pin end 112 and box end 172 is torqued to specification at the stage of assembly depicted in FIG. 8. Consequently, interface 266 and at least threads 118, 176 are pre-loaded or tightened, and therefore interface 266 is formed as a torqued interface during this stage of assembly for those embodiments.

Figure 9:
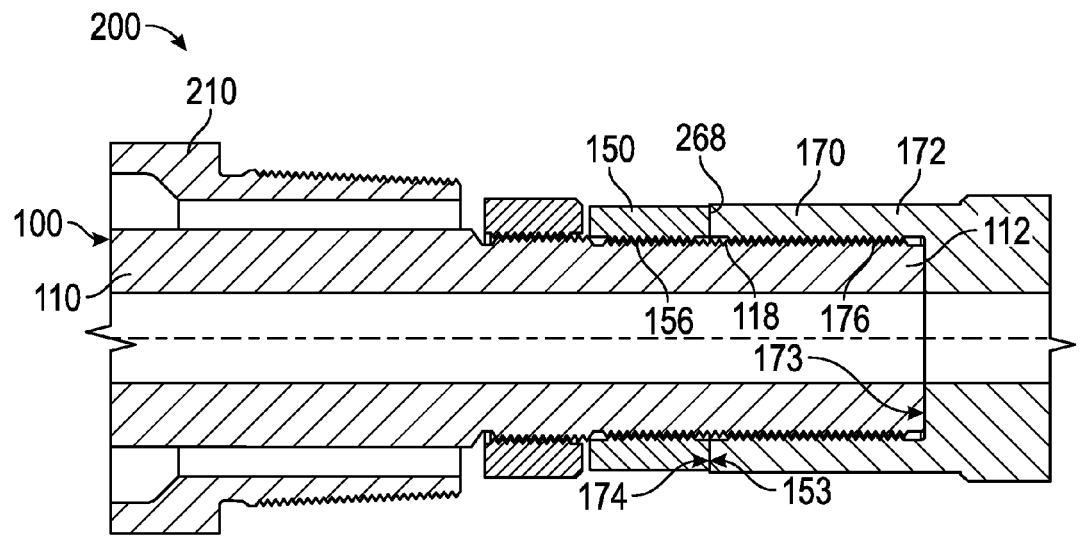
FIG. 9 is a schematic showing a cross-section of the torque apparatus of FIG. 6 at a third stage of assembly.

Referring now to FIG. 9, ring 150 is shown having been threaded back along the pin threads 118 toward box end 172 (after initially having been threaded onto pin end 112 in the opposite direction). This action eliminates the gap 264 and covers or engages the exposed threaded portion 118A (FIG. 8) between ring face 153 and the outer box face 174. In this manner, ring shoulder 153, i.e. ring face 153, is brought into contact with outer box face 174, forming an interface 268. The threaded connection of pin end 112, ring 150, and box end 172 of adapter 170, including interface 268, is made without torqueing or with minimal torqueing; even so, ring shoulder 153 contacts outer box face 174 to form interface 268, which is not torqued during this stage of assembly. In some other instances or some other embodiments, the connection made by ring 150 and box end 170 is torqued to specification at the stage of assembly depicted in FIG. 9, resulting in a second, torqued position of ring 150. Consequently, interface 268 and at least threads 118, 156, 176 are pre-loaded or tightened, and therefore interface 268 is formed as a torqued interface during this stage of assembly for those embodiments.

The movable threaded ring 150 and ring shoulder 153 may be adjustably positioned along the length of pin threaded section 116 at a convenient axial location to engage outer box face 174. This adjustability of the position of ring shoulder 153 allows torque apparatus 200 (or torque apparatus 100) to accommodate various embodiments of adapter 170, for example, embodiments having differing distances between the inner and outer box faces 173, 174. The adjustability of the position of ring shoulder 153 may also accommodate the eventual wearing and removal of material from ring shoulder 153, from inner box face 173, or from outer box face 174 during use, e.g. during repeated assembly and disassembly cycles.

Figure 10:
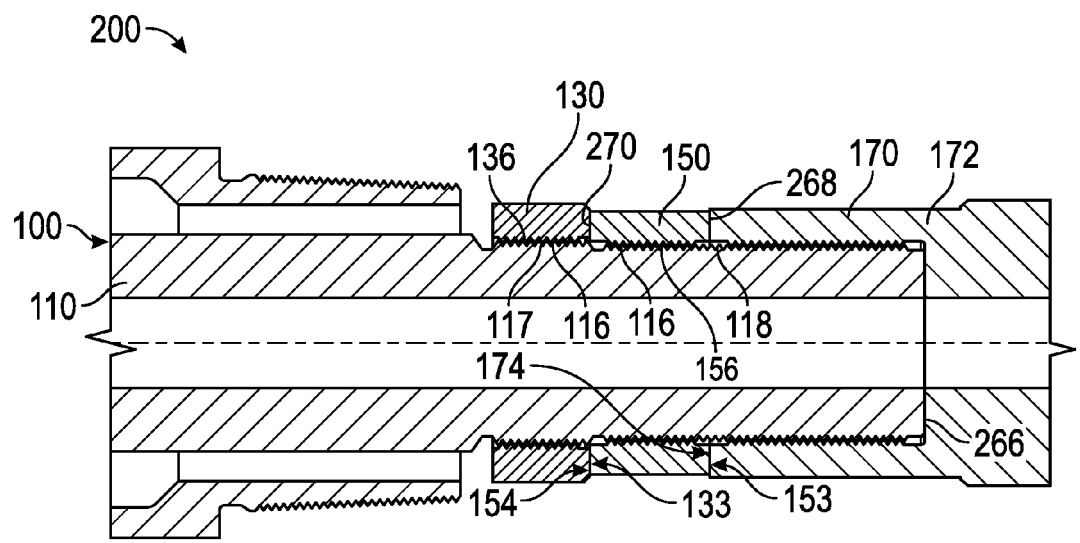
FIG. 10 is a schematic showing a cross-section of the torque apparatus of FIG. 6 at a fourth stage of assembly.

In FIG. 10, torque member 130 is shown having been threaded back along the pin threads 117 toward threaded ring 150 (after initially having been threaded onto pin end 112 in the opposite direction). This action eliminates the gap 262 and covers or engages the exposed threaded portion 117A between the torque member 130 and ring 150 (FIG. 8). In this manner, torque member face 133 is brought into contact with ring face 154, forming an interface 270. In at least some embodiments, the connection made by torque member 130 and ring 150 at the interface 270 is torqued to specification providing a second, torqued position of torque member 130. In this manner, interface 270, the pair of engaged threads 117, 136, and the pair of engaged threads 118, 156 are pre-loaded or tightened during assembly. In some of these embodiments, the torqueing of the connection made by member 130 and ring 150, including interface 270, is made by rotating torque member 130 while ring 150 does not rotate substantially. In some embodiments, ring 150 is held to prevent rotation. In this manner, the axial or angular location of ring shoulder 153 relative to threaded section 116 of pin end 112 and relative to outer box face 174 remains substantially unchanged. In various other embodiments, ring 150 is rotated when torqueing ring 150 together with torque member 130.

Thus, torque apparatus 100 includes three interfaces 266, 268, 270 formed between various contacting faces or shoulders of members 110, 130, 150, 170 as shown in FIG. 10 and in various other Figures of this disclosure. The three interfaces 266, 268, 270 may also be called torque-loading interfaces because each is configured to be torqued or tightened selectively by a rotation or moment of force applied to one or both of the members that form the interface. In various embodiments or in various stages of assembly of an embodiment, none, one, or all of these three interfaces 266, 268, 270 is/are torqued. So also, the various threaded interfaces formed between the members 110, 130, 150, 170 may be called torque-loading interfaces because each is configured to be torqued or tightened selectively by a rotation or moment of force applied to one or both of the members that form the interface.

In some embodiments, the configuration shown in FIG. 10 completes the assembly of an embodiment of torque apparatus 200. However, for the embodiment of FIG. 6, additional assembly stages are accomplished.

Figure 11:
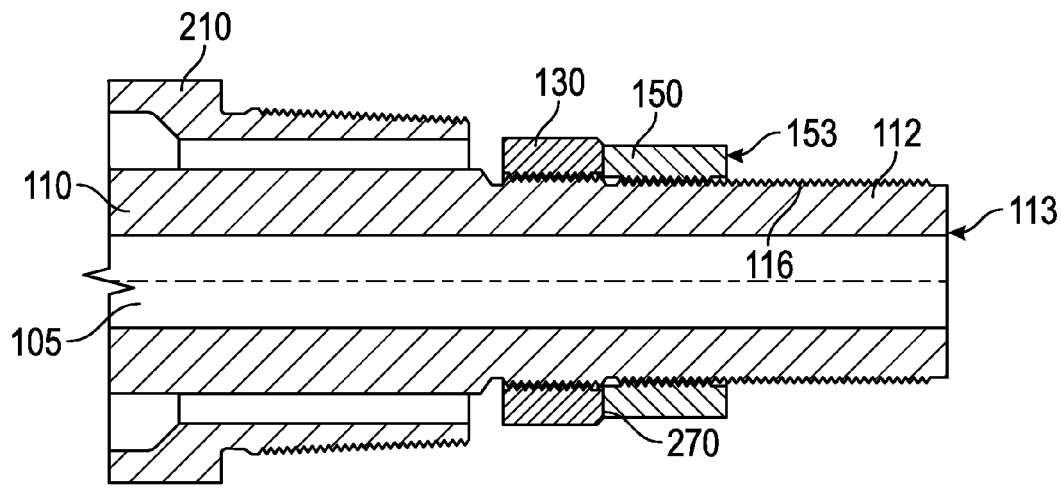
FIG. 11 is a schematic showing a cross-section of the torque apparatus of FIG. 6 at a fifth stage of assembly.

Referring now to FIG. 11, adapter 170 has been unthreaded and removed from mandrel 110 of torque apparatus 200. As shown, a threaded sub-assembly 105 includes tubular member 110, torque member 130 threadingly received on tubular member 110, and ring 150 threadingly received on the tubular member 110. Torque member 130 remains torqued relative to the ring 150, and interface 270 between members 130, 150 is formed and torqued as previously discussed. Because torque member 130 is torqued against threaded ring 150, threaded ring 150 with ring shoulder 153 remains substantially stationary, i.e. does not rotate and does not move axially relative to threaded section 116 and end face 113 on pin end 112. Sub-assembly 105 is an example of a threaded connection. Though not identified in FIG. 1, sub-assembly 105 is also visible in FIG. 1, for example.

Figure 12:
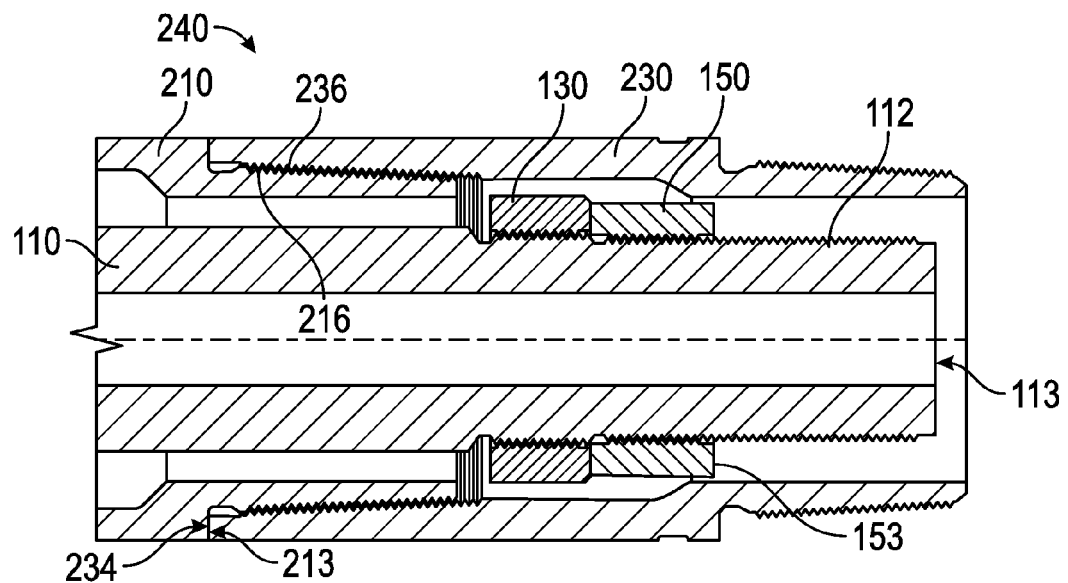
FIG. 12 is a schematic showing a cross-section of the torque apparatus of FIG. 6 at a sixth stage of assembly.

In FIG. 12, outer housing member 230 is installed around pin end 112, torque member 130, and threaded ring 150 of sub-assembly 105. Housing member 230 is threadingly coupled and torqued to outer housing member 210 by threaded sections 216, 236 to form housing assembly 240. End face 234 of housing member 230 abuts shoulder 213 of housing member 210 to form a torqued interface. Due to the coupling of threaded sections 216, 236 or the abutment of end face 234 and shoulder 213, the relative positions of housing members 210, 230 are generally fixed.

The housing assembly 240 fully contains pin end 112, torque member 130, and threaded ring 150. In other embodiments, a portion of pin end 112, torque member 130, or threaded ring 150 may extend beyond housing member 230. In the embodiment depicted in FIG. 12, torque member 130 and threaded ring 150 are inaccessible to tools (not shown) that may be used to tighten or loosen the connection made between torque member 130 and threaded ring 150. The inaccessibility of member 130 and ring 150 in the assembly stage of FIG. 12 is at least one reason why the position and torqueing of member 130 and ring 150 were accomplished during the assembly stage portrayed by FIG. 10. In FIG. 12, ring shoulder 153 remains in the same position relative to pin end 112 as was achieved during the assembly stages of FIG. 9 and FIG. 10.

After accomplishing the assembly stage of FIG. 12, adapter 170 is re-threaded onto pin end 112 of mandrel 110 to form the completed assembly of torque apparatus 200 shown in FIG. 6. Pin face 113 reengages inner box face 173, again forming the interface 266, and outer box face 174 reengages ring shoulder 153, again forming the interface 268. The threaded connection between pin end 112, box end 172, and threaded ring 150 is torqued to specification. More specifically, tubular member 170 is simultaneously torqued against mandrel 110 forming interface 266 and torqued against mandrel ring 150 forming interface 268 (see also FIG. 10). Thus, tubular member 170 is torqued against sub-assembly 105 at two face-to-face, torque-loading interfaces.

Thus, during various stages of the assembly for some embodiments, threaded ring 150 and ring shoulder 153 are pre-positioned along pin end 112 relative to pin end face 113 and locked at this position by the torqueing of members 130, 150 to form interface 270. The pre-positioning of ring 150 and ring shoulder 153 prior to the ultimate installation of adapter 170 are shown, for example in FIG. 11 and FIG. 12. The ultimate installation of adapter 170 in torque apparatus 200 is shown in FIG. 6 for at least one embodiment. The pre-positioning and locking of ring 150 and ring shoulder 153 along pin end 112 allow the temporary removal of adapter 170 to facilitate the installation of outer housing member 230, as shown in FIG. 12. The temporary removal of adapter 170 is particularly helpful if a portion of adapter 170, e.g. extending portion 178 in FIG. 6, has a larger diameter than the inner diameter of housing member 230.

Referring to FIG. 6, to disassemble torque apparatus 200, adapter 170 and housing member 230 are removed, and then threaded ring 150 and torque member 130 may be removed.

The stages of assembly and disassembly described in relationship to FIG. 7 through FIG. 11 for torque apparatus 200 are also generally descriptive of the assembly and disassembly process for torque apparatus 100 (FIG. 1), which lacks outer housing members 210 and 230. Of course, for torque apparatus 100, FIG. 1 represents the final assembly rather than FIG. 6.

Referring to FIG. 6, FIG. 9, and FIG. 10, the adjustable and controlled positioning of ring shoulder 153 along pin end 112 and the controlled torqueing of box end 172 against pin end 112 and against ring shoulder 153 provides two torqued interfaces 266, 268 configured to transmit torque or rotational power between mandrel 110 and adapter 170. This adjustable shoulder feature of torque apparatuses 100, 200 is augmented or facilitated, in part, by the third torqued interface 270 between torque member 130 and threaded ring 150. The torque capacity or the torsional capacity of the threaded connection of mandrel 110 and adapter 170 in torque apparatuses 100, 200 is substantially increased beyond the capacity of a conventional connection formed only from a pin end and a box end. Conventional connections between a pin end and a box end have only a single interface between a single pair of engaged faces or shoulders, and this single interface is disposed at a fixed axial location with respect to the pin end. Other conventional connections have a double shoulder type design, in which both the pin end and the box end have two shoulders or faces configured to engage at two axially-fixed interfaces rather than only one. However, these conventional shoulders are not axially adjustable along the threads of the pin end, unlike ring shoulder 153, which is movably coupled to pin end 112.

The inner box face 173 is a shoulder, and the ring shoulder 153 is an adjustable shoulder for coupling box end 172 to pin end 112 providing increased contact surface area to achieve the increased torque capacity or the torsional capacity of torque apparatuses 100, 200. The use of an adjustably positioned shoulder may be of particular advantage when the size (e.g. the outer diameter or inner diameter, i.e. the wall thickness) or the thread type of mandrel 110 or adapter 170 is limited for various pieces of equipment or in various operations. In one example, torque apparatus 200 forms part of a down-hole mud motor and a coupling assembly for rotating a formation-engaging drill bit in a subterranean borehole.

Thus, in an embodiment, when threadingly coupling a first and a second tubular member, a first and a second torque member may be threadingly received on the first tubular member. A shoulder of the second torque member may be moved into abutment against an end face of the second tubular member, and the second torque member may be held fixed in that position by the first torque member. In this manner, the second torque member provides a selectively movable shoulder that is brought into contact with the end face of the second tubular member for torqueing purposes. Being threadingly movable on the first tubular member, the second torque member provides an adjustable shoulder against which second tubular member may be torqued. In this manner, the movable second torque member provides flexibility in tolerances for the shoulder or end face of the second tubular while insuring the possibility of engaging the second tubular member. In contrast, conventional designs have a fixed shoulder that provides only set tolerances and no flexibility of same. Certain embodiments of the present disclosure include the increased torque capability of threaded connections along with predictability, repeatability, and consistency in the amount of torque applied to the torque-loading interfaces without exceeding design constraints associated with drilling operations.

Although, in the embodiment of FIG. 1, mandrel 110 and member 170 are tubular and have body portions that are annular in cross-section having central flow passages 122, 182, in some embodiments, a torque apparatus like apparatus 100 may be formed with a pin-ended member or box-ended member that differs. For example, a torque apparatus like apparatus 100 may be formed from a pin-ended mandrel that is not tubular but is solid, not having an annular cross-section or may be formed from a pin-ended mandrel that includes a different type of flow passage or that includes multiple flow passages. As another example, a torque apparatus like apparatus 100 may be formed from a box-ended member that is not tubular but is solid, not having an annular cross-section beyond the box end or may be formed from a box-ended member that includes a different type of flow passage or that includes multiple flow passages. Furthermore, the pin-ended member or box-end member may have body portions with a cross-section that is square, hexagonal, or any other suitable shape.

As indicated in the discussion of FIG. 11, threaded sub-assembly 105 may be formed by first assembling the torque apparatus 100, shown in FIG. 1 or FIG. 10, followed by the removal of tubular member or adapter 170 (FIG. 11). The use of tubular member or adapter 170 in forming sub-assembly 105 causes ring face 153 on ring 150 to be placed at a preferred axial location, which is beneficial when adapter 170 is later reattached (FIG. 6), for example, during final preparation for using torque apparatus 100. However, in other embodiments, threaded sub-assembly 105 may be formed into a threaded connection by threadingly coupling tubular member 110, torque member 130, and ring 150 without first adding and then removing adapter 170. Even in these instances, ring 150 may be threaded to a preferred axial location along pin-end 112, and that preferred axial location of ring 150 may be, for example, selected to match the axial distance between inner box face 173 and outer box face 174 of adapter 170. The distances between box faces 173, 174 may be previously known or may be measured. Then, after placement of ring 150, torque member 130 is torqued against ring 150 while ring 150 is held fixed against rotation; thus forming threaded sub-assembly 105 without having first added and then removed adapter 170 at pin-end 112.

In various embodiments, any of the pairs of faces configured to form torque-loading interfaces (e.g. faces 133, 154, faces 153, 174, or faces 113, 173) may have complementary (i.e. matched-opposing) shapes or contours including any of flat-radial, flat-tapered (i.e. each following an angle different than 90° with respect to axis 101), curved, and grooved for example. For a pair of faces that are curved, one face may have a convex curvature and the other face may have a concave curvature, or both faces may have a complex curvature featuring both concave and convex portions.

In some embodiments, a torque apparatus similar to torque apparatus 100 may be formed in which pin face 113 and inner box face 173 do not contact to make the interface 266. Even in such embodiments, ring 150 provides an axially adjustable shoulder 153 against which outer box face 174 engages to form the interface 268 to transmit torque or rotational power between mandrel 110 and adapter 170. So too in these embodiments, after the axial adjustment of ring 150, torque member 130 locks ring 150 and shoulder 153 in a fixed location. Ring shoulder 153 acts as a primary shoulder in place of (rather than in addition to) the pin face 113.

In some embodiments, an annular member lacking threads, which may also be called a washer, (not shown) is installed at any one or more of these locations: between pin face 113 and inner box face 173 at interface 266, between ring face 153 and outer box face 174 at interface 268, and between torque member face 133 and ring face 154 at interface 270. Preferably, each annular member has an inside diameter greater than the outermost diameter of the threads (e.g. threads 117, 118) over which it slides when being installed around pin end 112.

While exemplary embodiments have been shown and described, modifications thereof can be made by one of ordinary skill in the art without departing from the scope or teachings herein. The embodiments described herein are exemplary only and are not limiting. Many variations and modifications of the systems, apparatus, and processes described herein are possible and are within the teachings of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily indicate that the particular operation is necessary to the method. Unless expressly stated otherwise, the operations listed in a description of a method or in a method claim may be performed in any order, and in some implementations two or more of the operations may be performed in parallel, rather than serially.

What is claimed is:

1. A tubular threaded connection comprising:
    a threaded sub-assembly having a first tubular member, a first torque member threadingly received on the first tubular member, and a second torque member threadingly received on the first tubular member;
    wherein the first tubular member comprised a pin end having an externally-disposed pin face and an externally-disposed pin threaded section;
    wherein the first torque member is torqued relative to the second torque member,
    wherein the sub-assembly receives a second tubular member for torqueing against the sub-assembly wherein;
    the second tubular member comprises a box end having an inner box face, an outer box face, and an internally-disposed box threaded section extending between the outer box face and the inner box face; and
    the inner box, face engages the pin face and forms a first interface therebetween, and the outer box face engages the second torque member and forms a second interface therebetween.

2. The tubular threaded connection of claim 1 further comprising the second tubular member threadingly received on the first tubular member and torqued against the sub-assembly.

3. The tubular threaded connection of claim 2 wherein the second tubular member is torqued against the pin face on the first tubular member and is torqued against a torque face on the second torque member.

4. The tubular threaded connection of claim 1 wherein the pin threaded section comprises a single, uninterrupted threaded portion.

5. The tubular threaded connection of claim 1 wherein the pin threaded section comprises two threaded portions, the first threaded portion having a thread characteristic that differs from the second threaded portion.

6. The tubular threaded connection of claim 5 wherein the first threaded portion of the first tubular member has a larger thread diameter than the second threaded portion.

7. The tubular threaded connection of claim 5 wherein the first torque member is threadingly coupled to the first threaded portion; and
    wherein the box end of the second tubular member is threadingly coupled to the second threaded portion.

8. The tubular threaded connection of claim 7 wherein the second torque member is threadingly coupled to the second threaded portion.

9. The tubular threaded connection of claim 7 wherein the pin threaded section further comprises a third threaded portion disposed between the first and second threaded portions and having a thread characteristic that differs from the first and second threaded portions; and
   wherein the second torque member is threadingly coupled to the third threaded portion.

10. A tubular threaded connection comprising:
   a first tubular member comprising a pin end having externally-disposed pin face and an externally-disposed pin threaded section;
   a first torque member threadingly coupled to the pin end;
   a second torque member threadingly coupled to the pin end while the first torque member is coupled to the pin end;
   a second tubular member comprising a box end having an inner box face, an outer box face, and an internally-disposed box threaded section extending between the outer box face and the inner box face;
   wherein the box end is threadingly coupled to the pin end while the first and second torque members are coupled to the pin end;
   wherein the box end is further configured for the inner box face to engage the pin face to form a first interface therebetween;
   wherein the second torque member is movable from a first position to a second position against the outer box face of the second tubular member to form a second interface therebetween; and
   wherein the first torque member is movable from a third position to a fourth position against the second torque member to form a third interface therebetween.

11. The tubular threaded connection of claim 10 wherein the pin threaded section comprises two threaded portions, the first threaded portion having larger thread diameter than the second threaded portion.

12. The tubular threaded connection of claim 11 wherein the first torque member is threadingly coupled to the first threaded portion; and
   wherein the box end of the second tubular member is threadingly coupled to the second threaded portion.

13. The tubular threaded connection of claim 12 wherein the second torque member is threadingly coupled to the second threaded portion.

14. The tubular threaded connection of claim 10 wherein the first, second, and third interfaces are each torqued.

\* \* \* \* \*

UNITED STATES PATENT AND TRADEMARK OFFICE
CERTIFICATE OF CORRECTION

PATENT NO.       : 9,638,362 B2
APPLICATION NO.  : 14/268616
DATED            : May 2, 2017
INVENTOR(S)      : Nicholas Ryan Marchand It is certified that error appears in the above-identified patent and that said Letters Patent is hereby corrected as shown below:

In the Claims

Column 12, Line 30, which reads "wherein the first tubular member comprised"
Should read --wherein the first tubular member comprises--

Signed and Sealed this
Ninth Day of January, 2018

Joseph Matal
*Performing the Functions and Duties of the*
*Under Secretary of Commerce for Intellectual Property and*
*Director of the United States Patent and Trademark Office*